(12) United States Patent
Vo et al.

(10) Patent No.: US 12,216,688 B2
(45) Date of Patent: Feb. 4, 2025

(54) INFORMATION SYSTEM AND INFORMATION COLLECTION METHOD

(71) Applicant: Hitachi, Ltd., Tokyo (JP)

(72) Inventors: Thanh Hai Vo, Tokyo (JP); Dan Xu, Tokyo (JP); Shinichi Nakamura, Tokyo (JP); Noboru Fujita, Tokyo (JP); Daisuke Okabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 64 days.

(21) Appl. No.: 18/026,370

(22) PCT Filed: Sep. 24, 2021

(86) PCT No.: PCT/JP2021/035040
§ 371 (c)(1),
(2) Date: Mar. 15, 2023

(87) PCT Pub. No.: WO2022/137684
PCT Pub. Date: Jun. 30, 2022

(65) Prior Publication Data
US 2023/0350923 A1 Nov. 2, 2023

(30) Foreign Application Priority Data
Dec. 25, 2020 (JP) .................................. 2020-217543

(51) Int. Cl.
*G06F 16/00* (2019.01)
*G06F 16/28* (2019.01)
(Continued)

(52) U.S. Cl.
CPC ....... *G06F 16/288* (2019.01); *G06Q 10/0633* (2013.01); *G06Q 50/04* (2013.01)

(58) Field of Classification Search
None
See application file for complete search history.

(56) References Cited

U.S. PATENT DOCUMENTS

| | | | |
|---|---|---|---|
| 2003/0177440 A1 | 9/2003 | Kegoya et al. | |
| 2004/0196740 A1* | 10/2004 | Sachedina | G06Q 40/12 368/46 |

(Continued)

FOREIGN PATENT DOCUMENTS

| | | |
|---|---|---|
| JP | 9-081629 A | 3/1997 |
| JP | 2001-282316 A | 10/2001 |

(Continued)

OTHER PUBLICATIONS

Japanese Office Action received in corresponding Japanese Application No. 2020-217543 dated Sep. 12, 2023.

(Continued)

*Primary Examiner* — Thu Nguyet T Le
(74) *Attorney, Agent, or Firm* — MATTINGLY & MALUR, PC

(57) ABSTRACT

Provided is an information system and an information collection method that are capable of acquiring desired site data while preventing an increase in cost. A link logic definition unit 17 holds a link logic that is definition information defining a correspondence relation between an item value of the site data and a reference value that is an external value of transaction data used for acquiring the item value. A link logic data acquisition unit 18 acquires the item value of the site data by using the link logic.

8 Claims, 12 Drawing Sheets

(51) Int. Cl.
     *G06Q 10/0633*      (2023.01)
     *G06Q 50/04*        (2012.01)

(56)            References Cited

U.S. PATENT DOCUMENTS

2006/0136469 A1*  6/2006  Dettinger ............ G06F 16/2471
                                                      707/999.102
2019/0271969 A1*  9/2019  Miyamoto ....... G05B 19/41865

FOREIGN PATENT DOCUMENTS

JP        2009-48594   A    3/2009
JP        2010-267742  A   11/2010
JP        2019-153051  A    9/2019
JP        2020-095472  A    6/2020
WO        2018/189845  A1  10/2018

OTHER PUBLICATIONS

International Search Report of PCT/JP2021/035040 dated Nov. 22, 2021.
Japanese Office Action received in corresponding Japanese Application No. 2020-217543 dated Jul. 4, 2023.

\* cited by examiner

[FIG. 1]
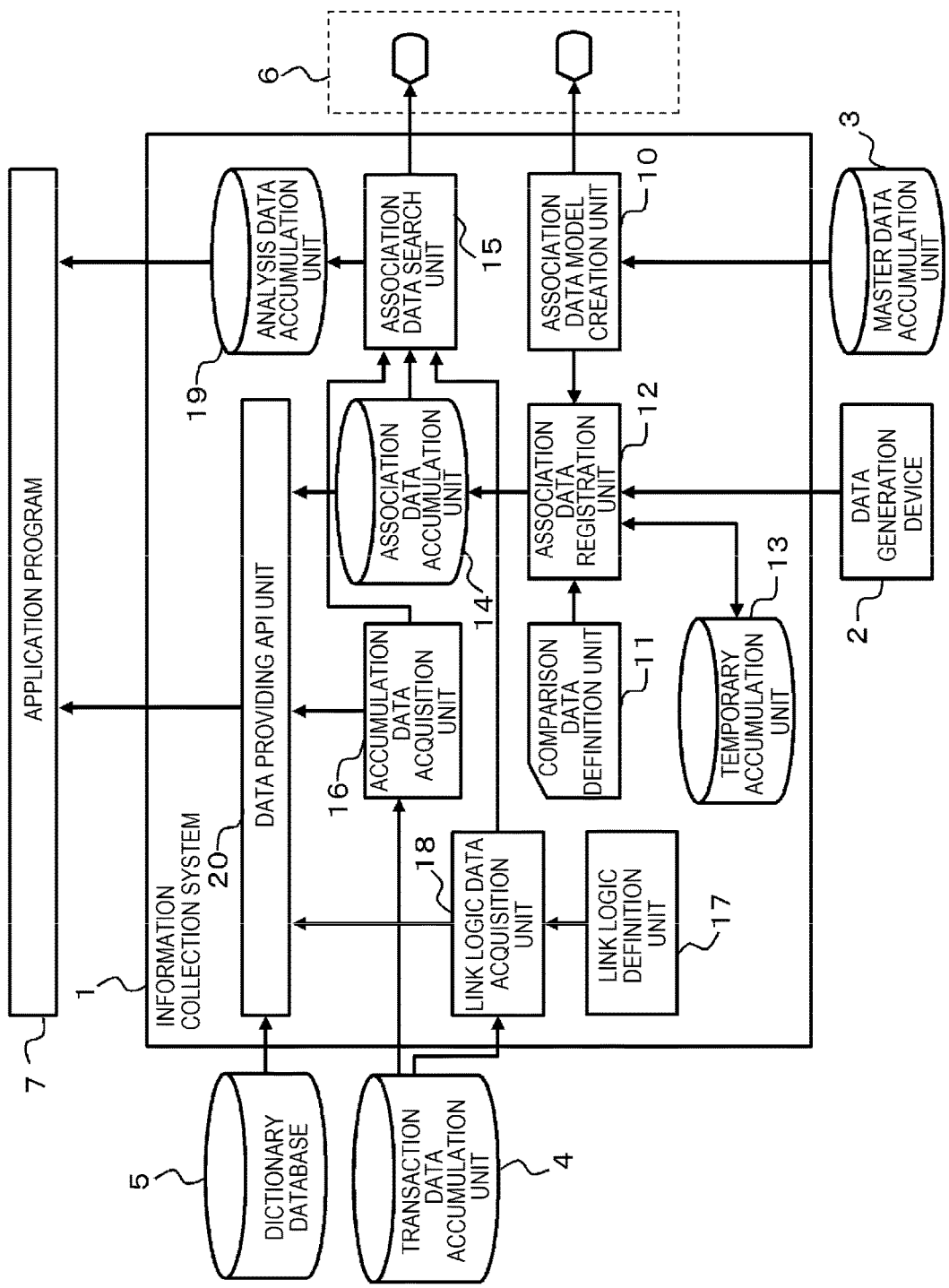

[FIG. 2]
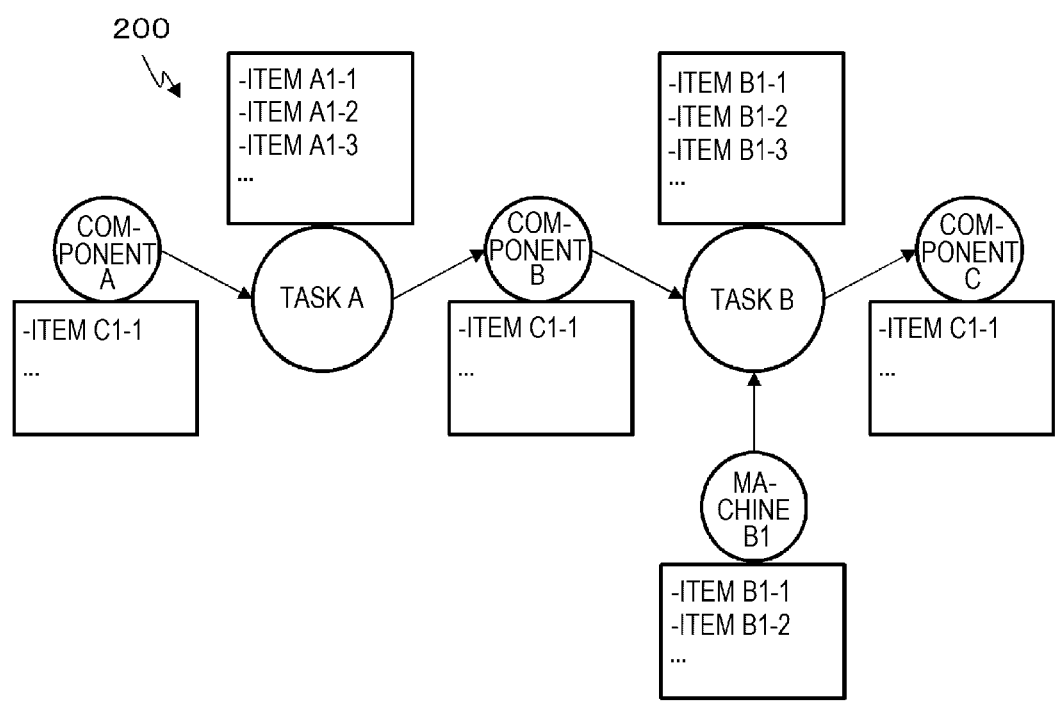

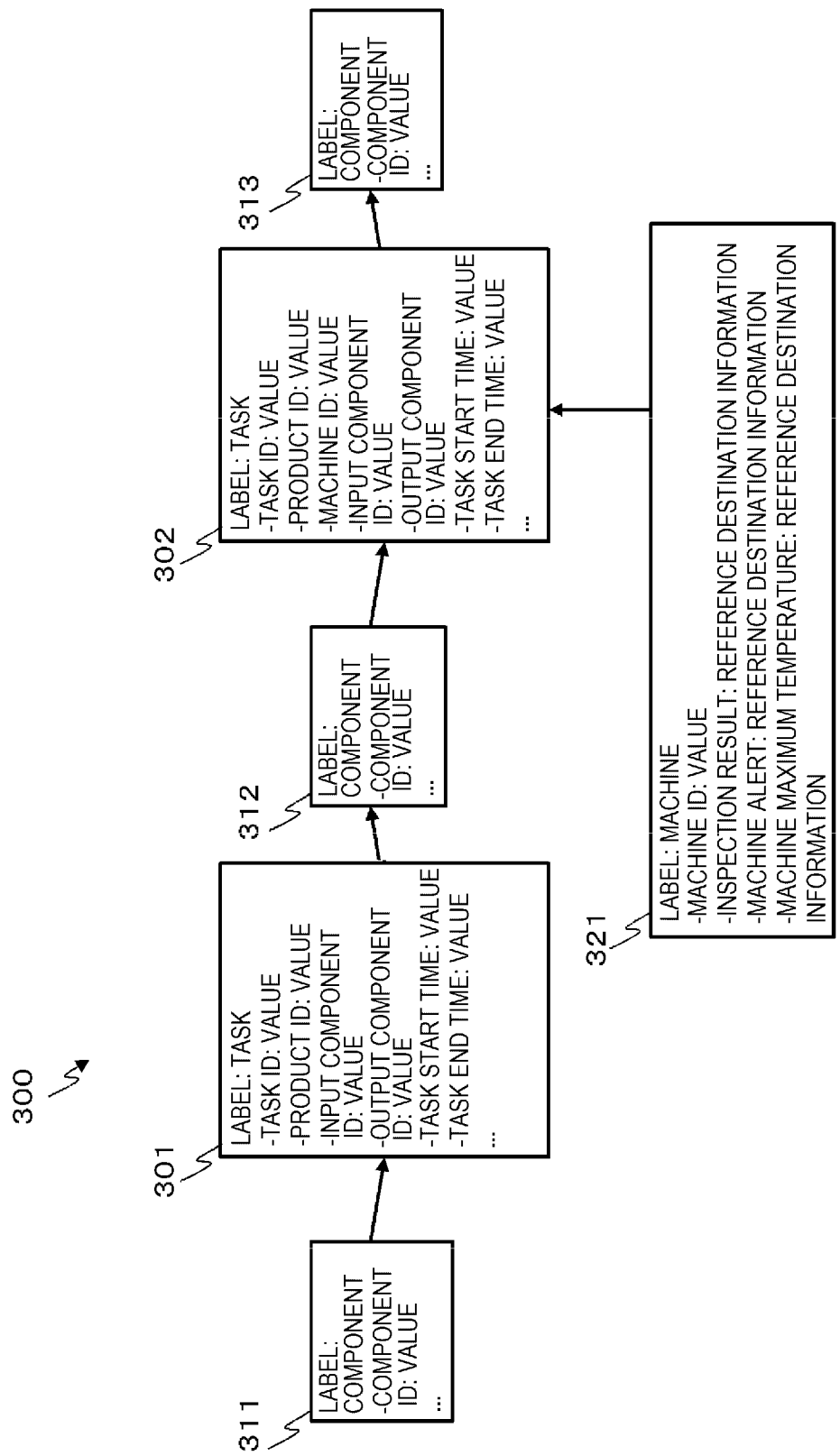
[FIG. 3]

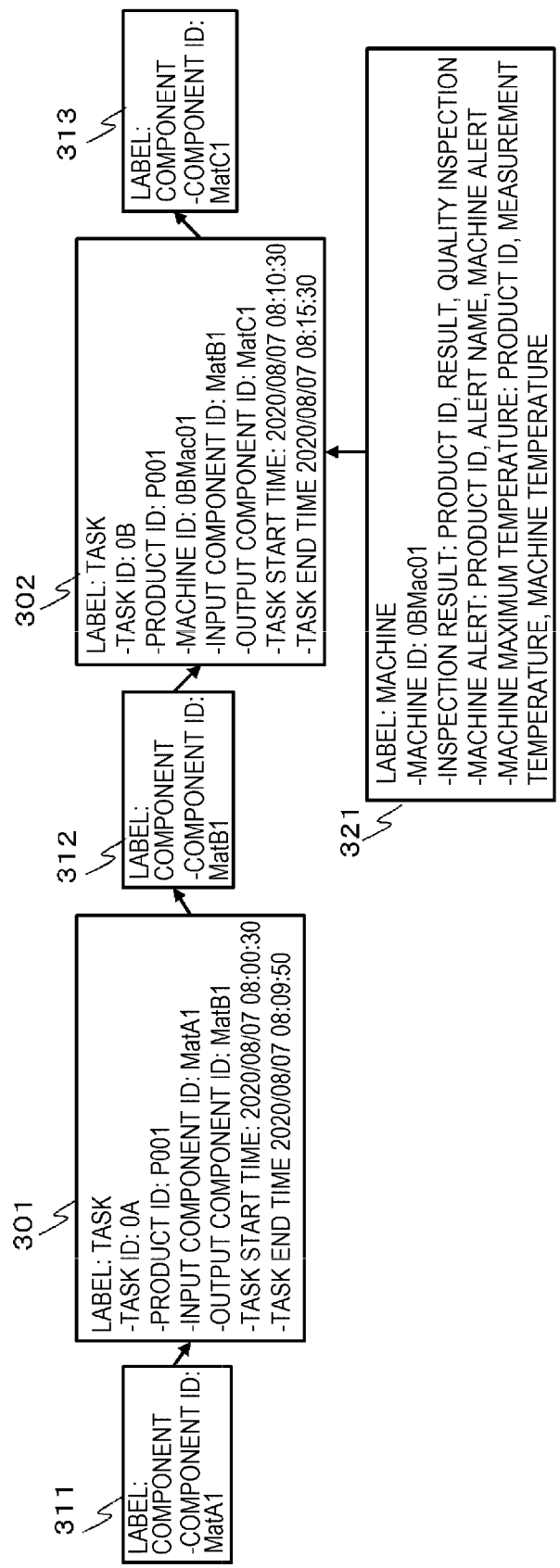

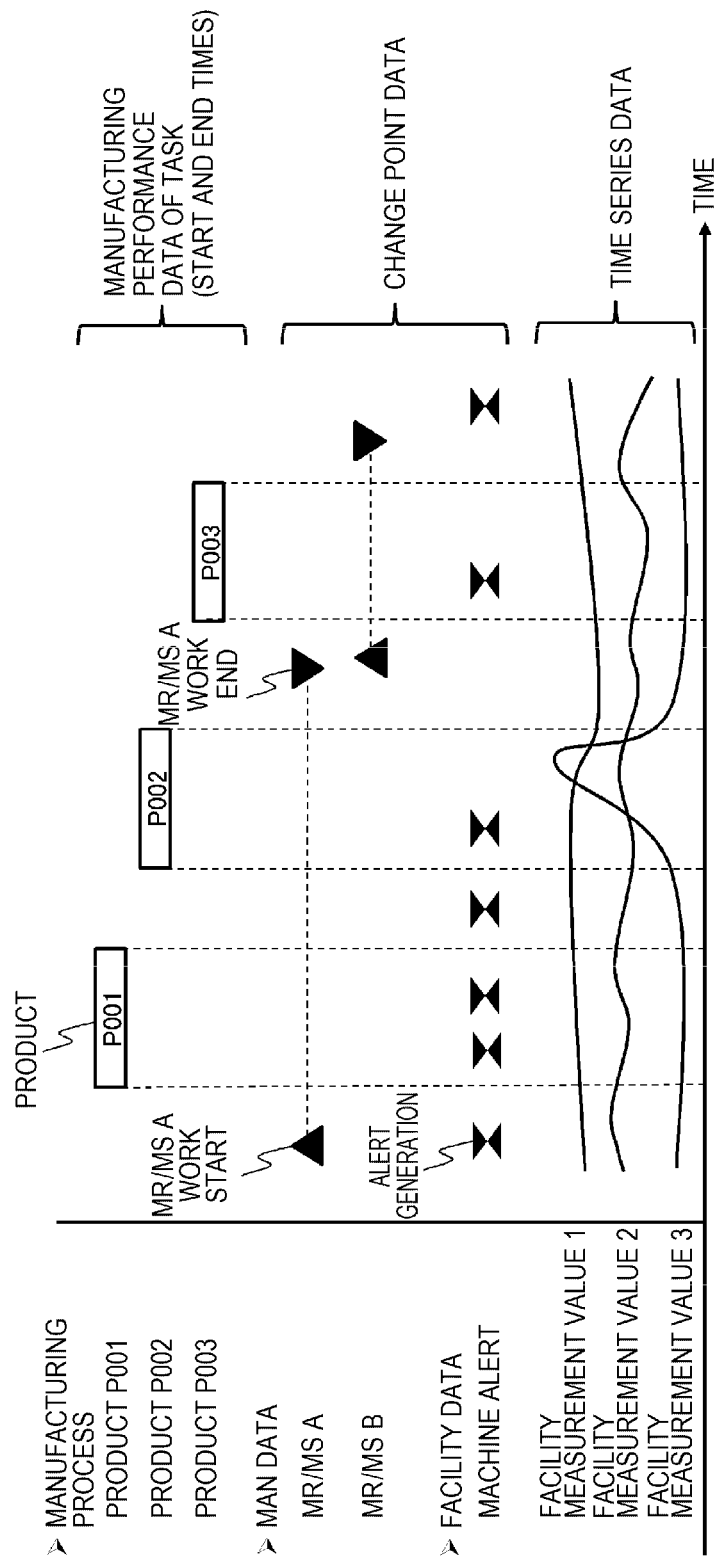
[FIG. 5]

[FIG. 6]
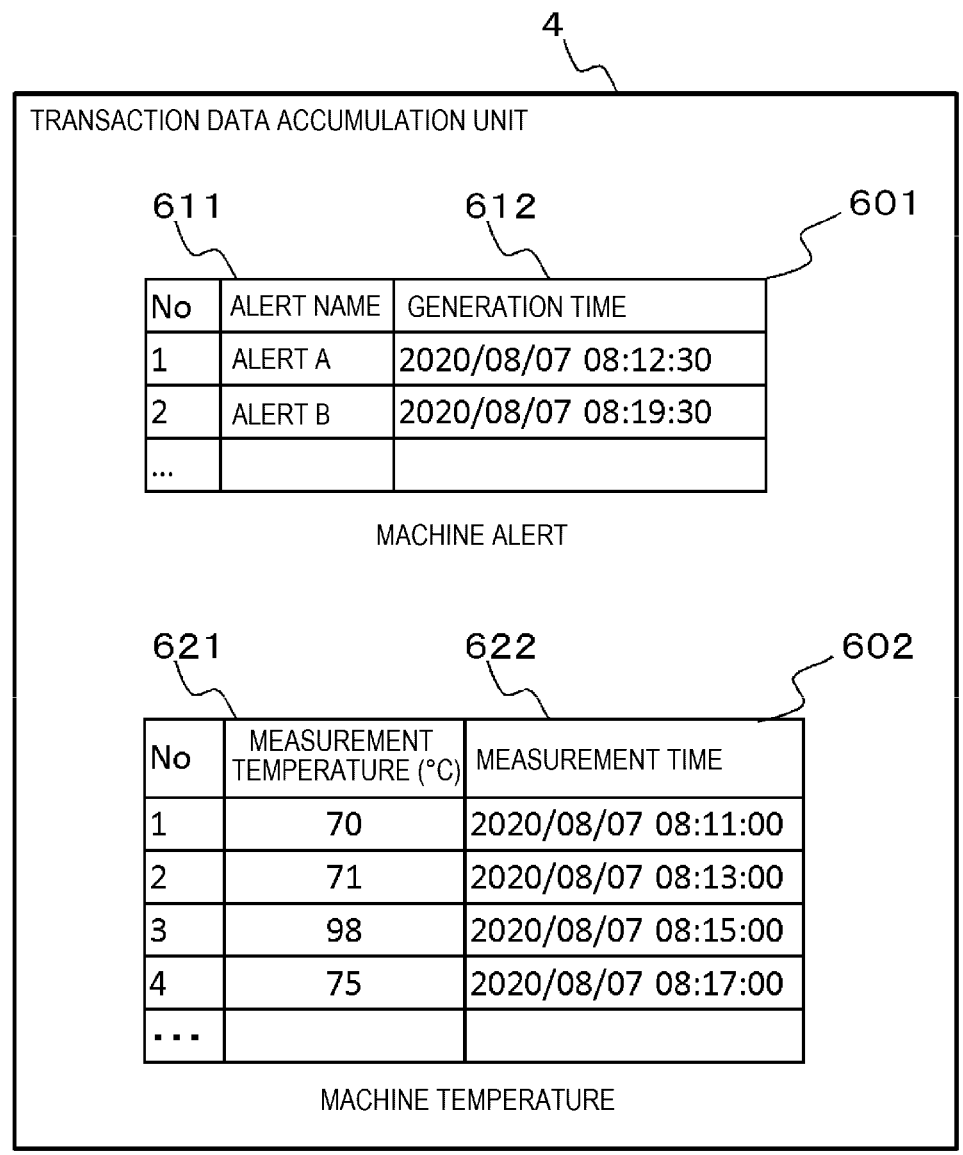

[FIG. 7]
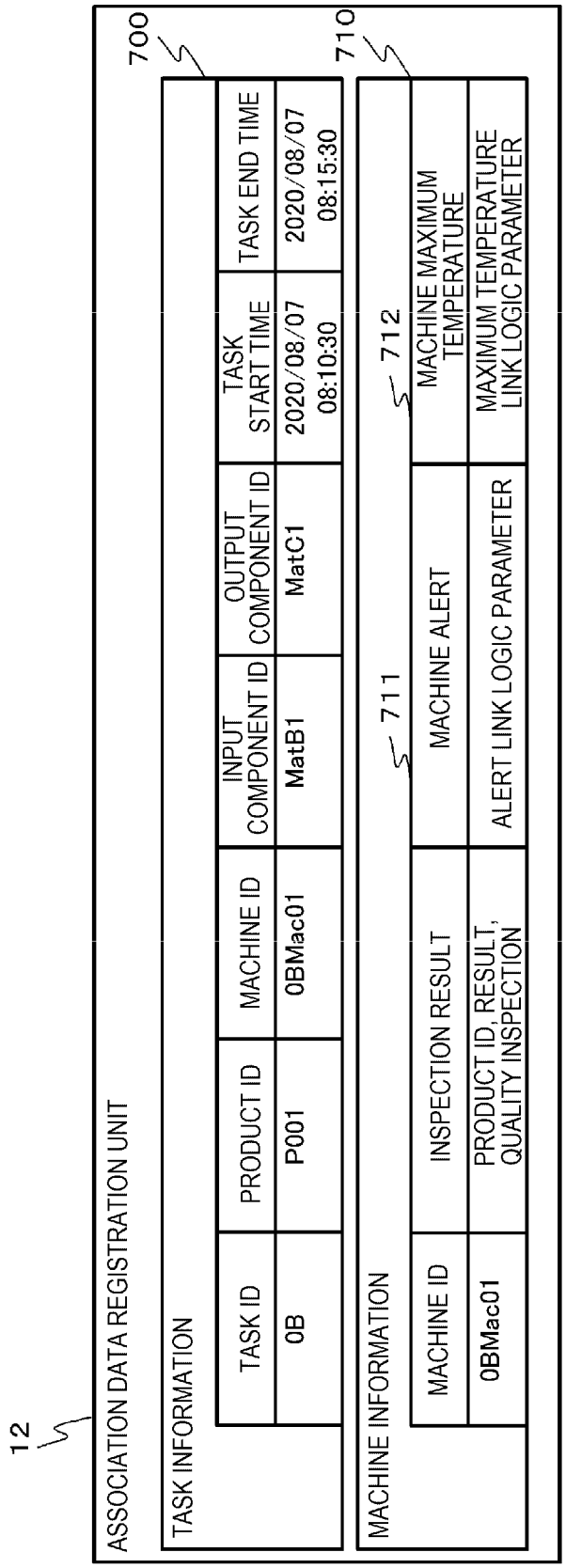

[FIG. 8]
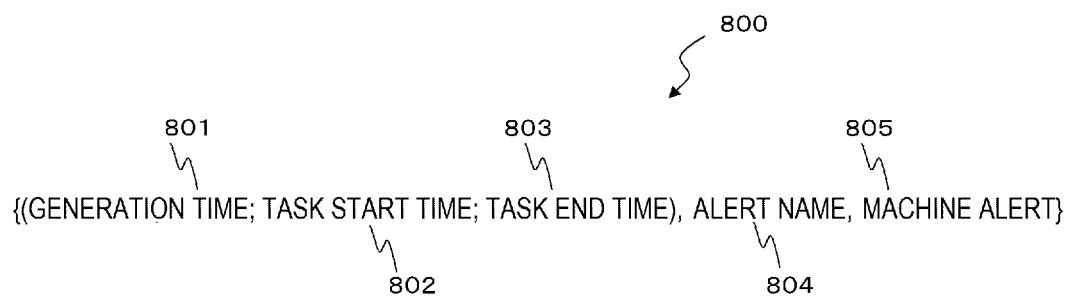
[FIG. 9]
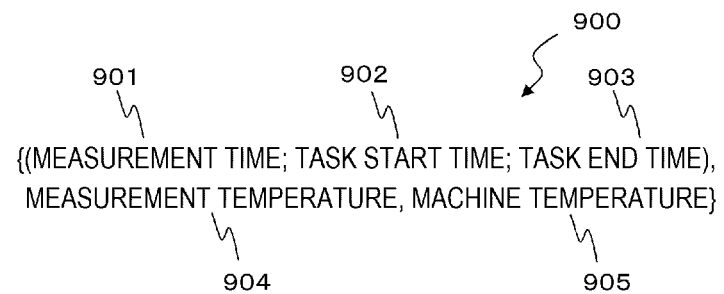

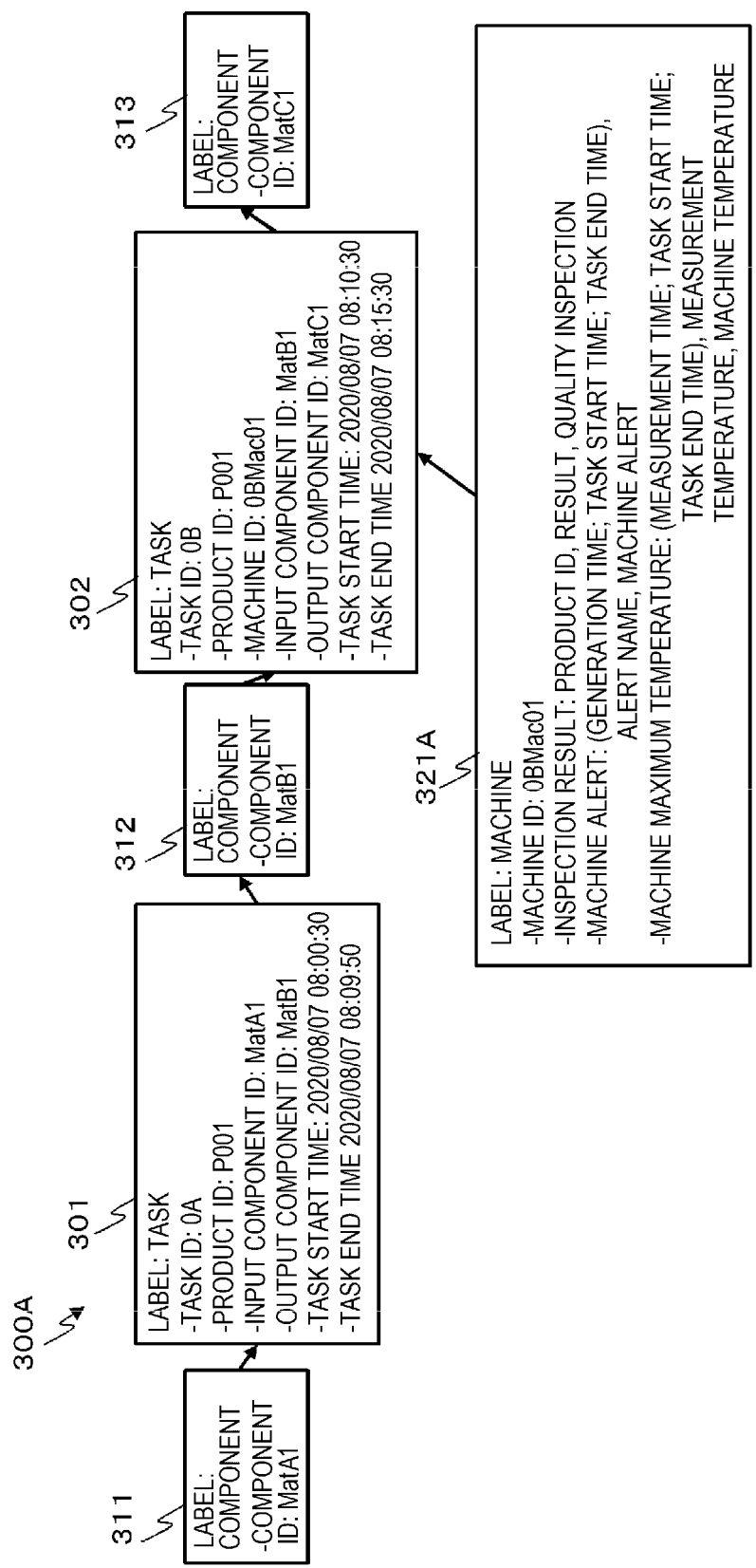

[FIG. 11]
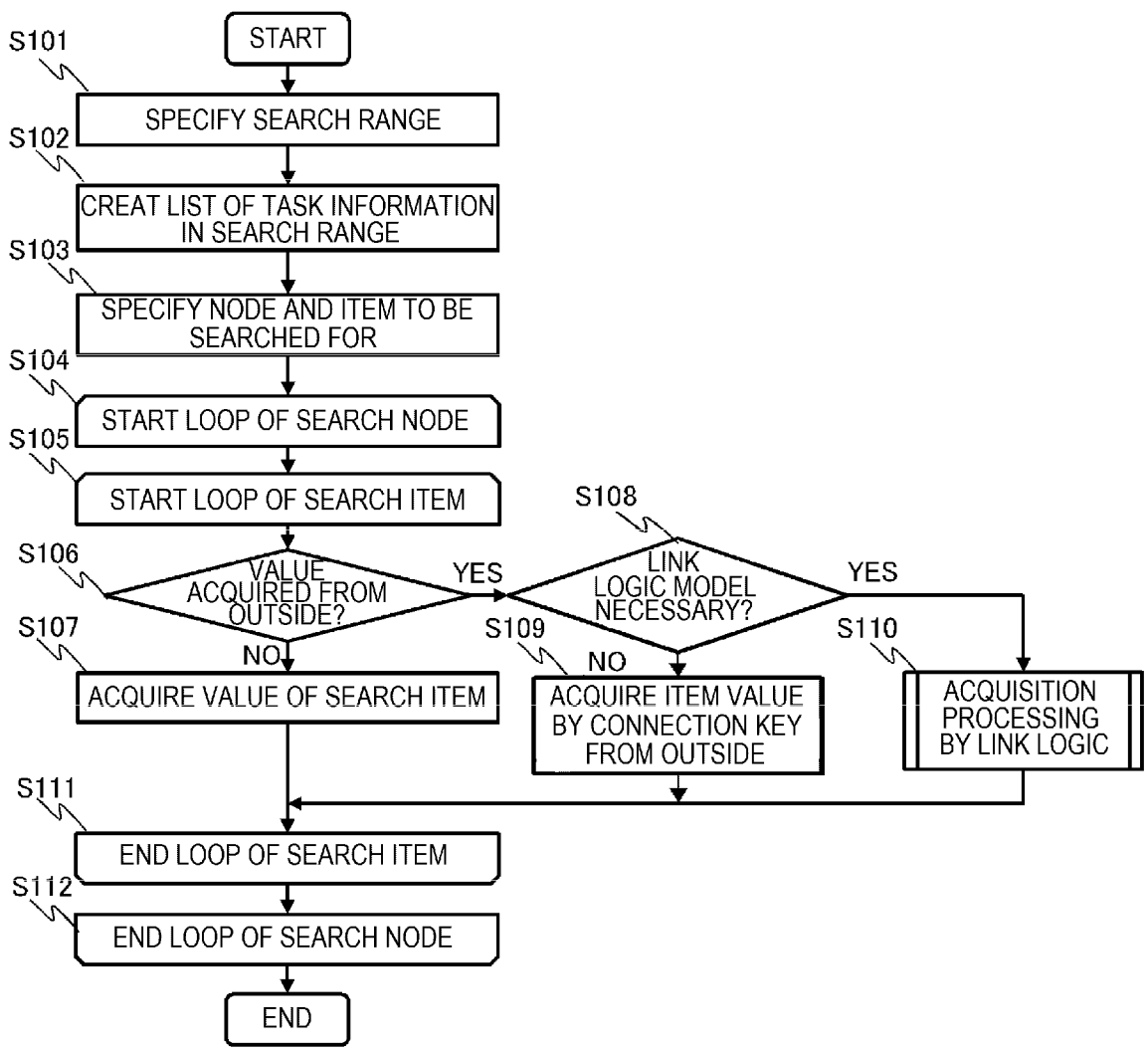

[FIG. 12]
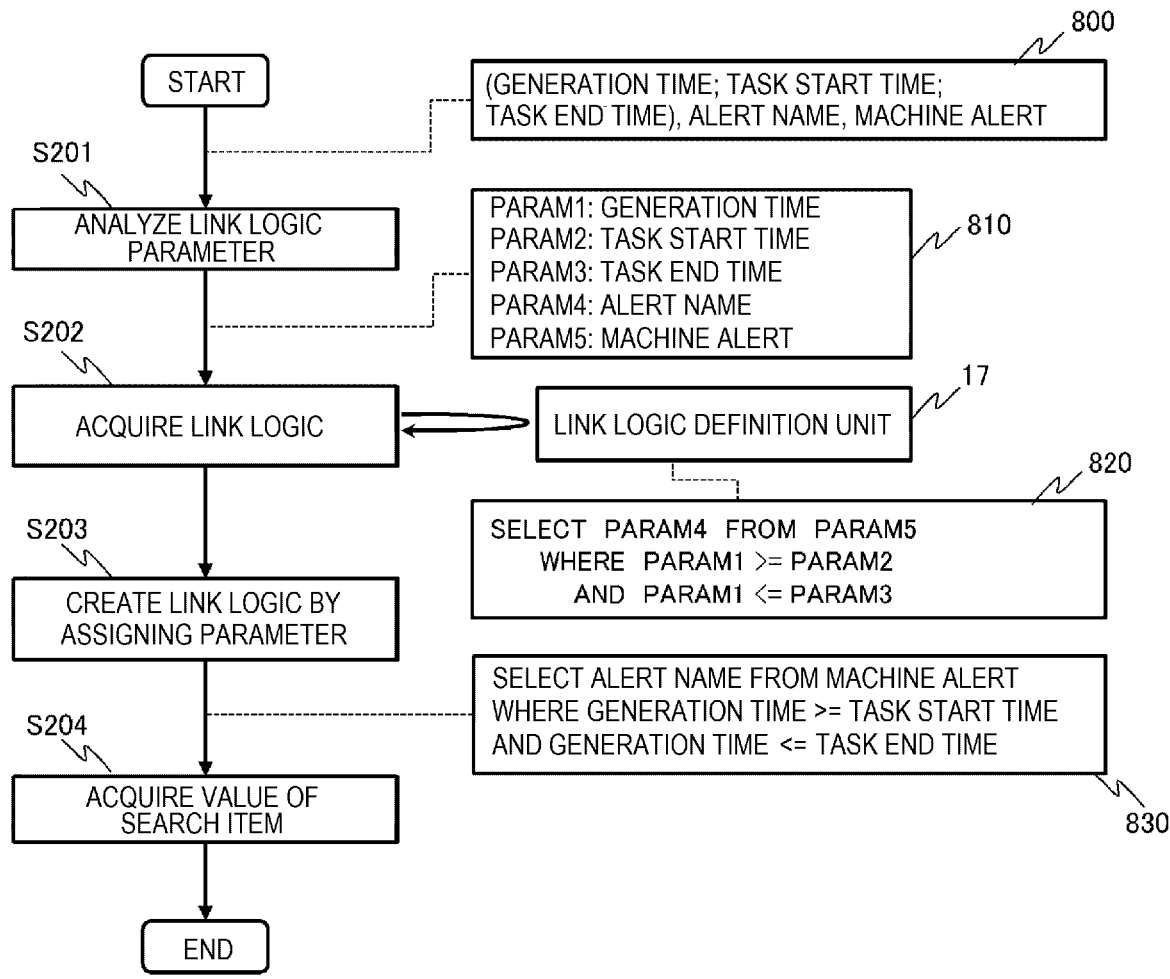

[FIG. 13]
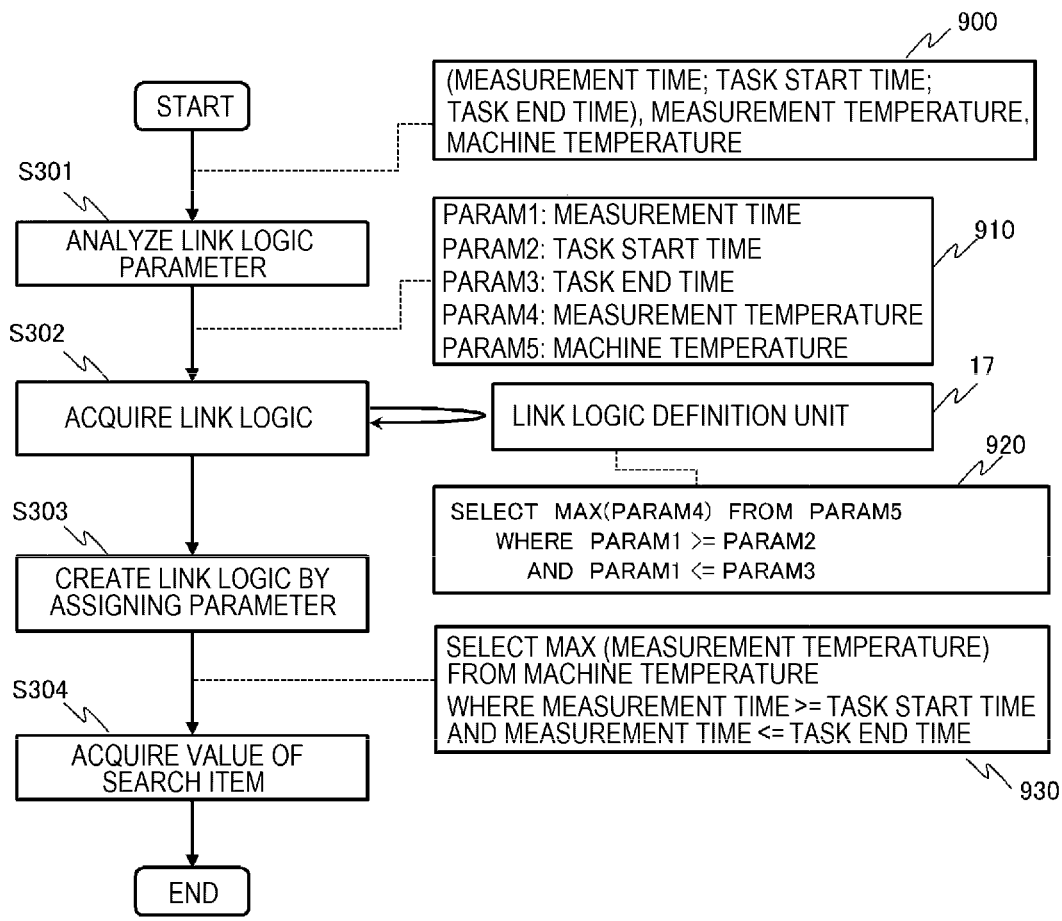

INFORMATION SYSTEM AND INFORMATION COLLECTION METHOD

TECHNICAL FIELD

The present disclosure relates to an information system and an information collection method.

BACKGROUND ART

In general, a process such as a manufacturing process for manufacturing a product includes a plurality of tasks (steps). In each task, various kinds of site data are generated according to execution of the task, and the site data is collected and analyzed to optimize efficiency of the task and the like. However, when management departments that manage the tasks are different, it is difficult to share the site data between the tasks, and efficiency of the entire process may be hindered.

However, PTL 1 discloses an information collection and display system that generates association data which associates site data related to each task included in a manufacturing process, and that uses the association data to search for and acquire site data related to another task included in the same manufacturing process as a designated task. In the information collection and display system, since the site data related to another task may be acquired, the site data may be shared between the tasks.

CITATION LIST

Patent Literature

PTL 1: JP2019-153051A

SUMMARY OF INVENTION

Technical Problem

In the information collection and display system described in PTL 1, a value of the site data associated with the association data may be acquired from transaction data that is external data managed externally. The information collection and display system associates the site data with the external data in advance using a connection key such as identification information for identifying the transaction data, and acquires the value of the site data from the external data using the connection key.

However, in an existing factory and the like, external data may be collected in each task using an existing system different from the system that collects the site data, and in such a case, the external data does not necessarily have the connection key and it is difficult to acquire desired site data.

A method of changing a structure of the external data collected by the existing system used in each task to provide the external data with the connection key is also considered. In order to implement the method, it is necessary to modify the existing system or introduce a new system, and thus there is a problem that a cost increases.

An object of the present disclosure is to provide an information system and an information collection method that are capable of acquiring desired site data while preventing an increase in cost.

Solution to Problem

An information system according to an aspect of the present disclosure is an information system for acquiring an item value that is a value of site data based on an external value that is a value of external data. The information system includes a link logic definition unit configured to hold a link logic that is definition information defining a correspondence relation between the item value and a reference value that is the external value used for acquiring the item value, and a link logic data acquisition unit configured to acquire the item value of the site data using the link logic.

Advantageous Effects of Invention

The present disclosure can acquire the desired field data while preventing the increase in cost.

BRIEF DESCRIPTION OF DRAWINGS

FIG. 1 is a block diagram showing a functional configuration of an information collection system according to an embodiment of the present disclosure.

FIG. 2 is a diagram showing an example of an association data model.

FIG. 3 is a diagram showing an example of association data.

FIG. 4 is a diagram showing an example of the association data.

FIG. 5 is a diagram showing an example of a situation in which transaction data having no connection key is generated.

FIG. 6 is a diagram showing an example of the transaction data having no connection key.

FIG. 7 is a diagram showing another example of the association data.

FIG. 8 is a diagram showing an example of an alert link logic parameter.

FIG. 9 is a diagram showing an example of a maximum temperature link logic parameter.

FIG. 10 is a diagram showing another example of the association data.

FIG. 11 is a flowchart showing an example of search processing.

FIG. 12 is a flowchart showing an example of acquisition processing.

FIG. 13 is a flowchart showing another example of the acquisition processing.

DESCRIPTION OF EMBODIMENTS

Hereinafter, an embodiment of the present disclosure will be described with reference to the drawings.

FIG. 1 is a block diagram showing a functional configuration of an information collection system according to the embodiment of the present disclosure. An information collection system 1 shown in FIG. 1 is an information system for collecting site data generated according to each task in a process including a plurality of tasks (steps). In the present embodiment, the process is a manufacturing process for manufacturing a product (finished product), and the information system of the present disclosure is not limited to this example.

The information collection system 1 is connected to a data generation device 2, a master data accumulation unit 3, a transaction data accumulation unit 4, a dictionary database 5, a user interface 6, and an application program 7.

The data generation device 2 is a device that generates the site data according to execution of the task in the manufacturing process. For example, one or a plurality of data generation devices 2 are provided for each task. The data generation device 2 is, for example, a bar code reader that acquires a work log of a worker, a PC or a server that collects the work log, a machine that processes or assembles a component of a finished product, and a radio frequency identifier (RFID) reader that collects information of an RFID attached to the component and the finished product. The data generation device 2 is a link external device linked with the information collection system 1, and the site data to be generated by the data generation device 2 includes, for example, identification information for specifying the site data and a generation date and time when the site data is generated.

The master data accumulation unit 3 is, for example, a storage device such as a server or a memory that stores data. The master data accumulation unit 3 accumulates, as master data, a candidate of an association data model that defines a data structure of association data indicating an association between the site data generated by the data generation device 2.

The transaction data accumulation unit 4 is a storage device, and accumulates transaction data which is the site data generated by the data generation device 2. For example, one or more transaction data accumulation units 4 may be provided for each management department that manages each task. The transaction data may be used as external data referred to by another piece of site data.

The dictionary database 5 stores a dictionary in which a synonym related to an item name used in the site data, the transaction data, and the like is collected.

The user interface 6 is a device having a function of an input unit that receives various pieces of information from a user and a function of an output unit that outputs information to the user (for example, displays a search result of the association data). For example, the user interface 6 provides a selection screen for selecting the association data model from the master data accumulated in the master data accumulation unit 3, a search condition input screen for searching for the site data, and a search result display screen for displaying a search result of the site data. The search condition input screen includes a screen for specifying a range of a piece of the site data to be searched for and a search item. The user interface 6 may include a plurality of devices.

The application program 7 is executed by an external device such as a server or a terminal not shown, and performs data processing according to data provided from the information collection system 1. The data processing is, for example, analysis processing for analyzing data.

The information collection system 1 includes an association data model creation unit 10, a comparison data definition unit 11, an association data registration unit 12, a temporary accumulation unit 13, an association data accumulation unit 14, an association data search unit 15, an accumulation data acquisition unit 16, a link logic definition unit 17, a link logic data acquisition unit 18, an analysis data accumulation unit 19, and a data providing application programming interface (API) unit 20.

The information collection and display system 1 further includes a central processor (for example, a processor such as a central processing unit (CPU)) that controls the entire information collection and display system 1, a storage device (for example, a read only memory (ROM)) that stores various programs defining an operation of the central processor, and a primary storage device (for example, a random access memory (RAM) or a hard disk drive (HDD)) that temporarily stores information used or generated in the central processor, and the central processor reads the programs stored in the storage device and executes the read programs to implement functions of the units 10 to 20.

The association data model creation unit 10 creates any one type of the master data accumulated in the master data accumulation unit 3, as the association data model that defines the data structure of the association data, according to a selection instruction to select the association data model received according to the selection screen provided by the user interface 6.

The comparison data definition unit 11 holds comparison data that defines a correspondence relation between the identification information included in the site data and the type of the site data.

The association data registration unit 12 receives the site data from the data generation device 2 and accumulates the site data in the temporary accumulation unit 13. At this time, the association data registration unit 12 specifies the type of the site data based on the identification information included in the site data and the comparison data held in the comparison data definition unit 11, and adds type information indicating the type to the site data. In addition, the association data registration unit 12 generates the association data indicating an association between the site data accumulated in the temporary accumulation unit 13 according to the association data model created by the association data model creation unit 10, and accumulates the association data in the association data accumulation unit 14.

The type of the site data includes task information indicating the task and task association information indicating an association object related to the task. The task association information includes worker information indicating a worker who performs the task as an association object, machine information indicating the machine used in the task as an association object, procedure information indicating a method of the task as an association object, and component information indicating a material (component) used or generated in the task as an association object. The task association information may be referred to as 4M information by extracting M, that is, initial letters of a man, a machine, a method, and a material expressed in English.

The site data includes one or more items. The item value of each item may be actually stored in the site data or may be acquired with reference to an external value which is a value of the transaction data accumulated in the transaction data accumulation unit 4. When the external value is referred to, reference destination information that specifies a reference value, which is an external value to be referred to, is formally stored as an item value in the site data. The reference destination information includes link reference destination information when the transaction data includes a connection key for specifying the reference value and a non-link reference destination information when the transaction data does not include the connection key for specifying the reference value. In the present embodiment, the connection key is process identification information for identifying the manufacturing process. In the present embodiment, a product ID for identifying the product manufactured by the manufacturing process is used as the process identification information.

The association data search unit 15 is a search unit that searches for the site data according to a search instruction received according to the search condition input screen provided by the user interface 6 from the user, based on the association data accumulated in the association data accumulation unit 14. The search instruction includes, for example, designation information for designating the range of the site data to be searched for, and the search item.

When the reference destination information is stored in the item value of the site data searched for by the association data search unit 15, the accumulation data acquisition unit 16, the link logic definition unit 17, and the link logic data acquisition unit 18 constitute an acquisition unit that acquires the transaction data having the reference value that is the external value used for acquiring the item value based on the reference destination information, and that acquires the item value based on the reference value.

When the reference destination information of the site data searched for by the association data search unit 15 is the link reference destination information having the connection key, the accumulation data acquisition unit 16 acquires the item value of the site data based on the reference value of the transaction data accumulated in the transaction data accumulation unit 4 using the connection key.

When the reference destination information of the site data searched for by the association data search unit 15 is the non-link reference destination information having no connection key, the link logic definition unit 17 holds a link logic model which is definition information that defines a correspondence relation between the item value of the site data and the reference value that is the value of the transaction data used to acquire the item value. The link logic model is determined according to, for example, the association data model created by the association data model creation unit 10.

When the reference destination information of the site data searched for by the association data search unit 15 is the non-link reference destination information, the link logic data acquisition unit 18 acquires the item value of the site data from the transaction data of the transaction data accumulation unit 4 based on the reference destination information and the link logic model held by the link logic definition unit 17.

The analysis data accumulation unit 19 accumulates the site data searched for by the association data search unit 15 as analysis data. The analysis data includes the item values acquired by the accumulation data acquisition unit 16 and the link logic data acquisition unit 18. The analysis data may include a connection relation between the site data. The analysis data may be provided to the application program 7.

According to an instruction and the like from the application program 7, the data providing API unit 20 provides the association data accumulated in the association data accumulation unit 14, the transaction data referred to by the accumulation data acquisition unit 16 and the link logic data acquisition unit 18, and the like to the application program 7. For example, the data providing API unit 20 provides data (association data and transaction data) having an item designated by the application program 7 to the application program 7. At this time, an item name or the like of the 4M information indicated by the association data and the transaction data may have a variation. Therefore, the data providing API unit 20 may refer to a dictionary in the dictionary database 5 to provide not only data having the same item name as the item name specified by the application program 7 but also data having an item name similar to the item name specified by the application program 7.

FIG. 2 is a diagram showing an example of the association data model created by the association data model creation unit 10. An association data model 200 shown in FIG. 2 defines a data structure of each piece of site data (task information and 4M information) and an association between the site data. In the present embodiment, each task creates one or more components by using one or more components. The components used in the task are referred to as input components, and the components to be created in the task are referred to as output components. A finished product created in a last task may also be referred to as the component. The task and the 4M (association object) may be referred to as nodes.

Each piece of task information is associated with component information of the input component and the output component of the task. When the 4M information related to the machine used in the task indicated by the task information, the worker who is involved in the task, and the work procedure of the task is present, the 4M information is associated with the task information. In an example of FIG. 2, an input component of a task A is a component A, an output component of the task A is a component B, an input component of a task B is the component B, an output component of the task B is a component C, and the machine information which is one of the 4M information is associated with the task information of the task B. In the present embodiment, the machine is an inspection machine for inspecting the component, but the machine is not limited to this example.

FIG. 3 is a diagram showing an example of the association data. Association data 300 shown in FIG. 3 is an example of the association data generated according to the association data model 200 shown in FIG. 2, and includes task information 301 and 302, component information 311 to 313, and machine information 321 as the site data. The task information 301 and 302 include a label "task" which is the type information, and as items, a task ID for identifying the task, a product ID for specifying a product to be manufactured in a manufacturing process including the task, a task start time at which the task is started, and a task end time at which the task is ended. When the association object related to the task is present, the task information 301 and 302 include an ID for specifying the association object as an item. In an example of FIG. 3, the tasks 301 and 302 include an input component ID for specifying a component to be input to the task and an output component ID for specifying a component to be output from the task, and the task 302 includes a machine ID for identifying a machine used in the task.

The component information 311 to 313 include a label "component" which is the type information, and as an item, a component ID for specifying the component. The machine information 321 includes a label "machine" which is the type information, and as items, a machine ID for specifying a machine, an inspection result of inspection for the component by the machine, a machine alert which is an alert generated by the machine, and a machine maximum temperature which is a maximum temperature of the machine. The items "inspection result", the "machine alert", and the "machine maximum temperature" of the machine information 321 have the reference destination information as the item values.

FIG. 4 is a diagram in which a specific example of each item of the item is added to the association data 300 shown in FIG. 3. In FIG. 4, the reference destination information stored as the item values of the items "inspection result", the "machine alert", and the "machine maximum temperature" of the machine information 321 is the link reference destination information including the product ID that is the connection key. A data structure of the reference destination information is defined by the association data model, and in an example of FIG. 4, includes {connection key (product ID), column name, and table name}. When a plurality of transaction data accumulation units 4 that store the transaction data are provided, the reference destination information may include identification information for specifying the transaction data accumulation unit 4 that is a reference destination target. In the present embodiment, it is assumed that there is only one transaction data accumulation unit 4 and the transaction data accumulation unit 4 can be specified without the identification information. {A, B, C, and so on} indicates a data structure arranged in the order of A, B, C, and so on. In addition, there are a plurality of pieces of transaction data, and each piece of transaction data is table data having a table structure. The "table name" is identification information for specifying the transaction data (table data), and the "column name" is identification information for specifying a column of the transaction data. That is, the reference destination information {connection key, column name, table name} indicates that a value associated with the product ID among values stored in the column specified by the "column name" in the transaction data of the "table name" is used as an actual item value. Therefore, in the transaction data, the value of each column and the product ID need to be associated with each other in advance.

However, the transaction data does not necessarily have the connection key. FIG. 5 is a diagram showing an example of a situation in which the transaction data having no connection key is generated.

In an example of FIG. 5, in a situation in which manufacturing processes for manufacturing products "P001" to "P002" are intermittently performed, man data indicating a start time and an end time of the work of each worker related to the task and facility data related to the machine are generated as the transaction data. The facility data includes a machine alarm that intermittently occurs and facility measurement values 1 to 3 acquired as time-series data. The man data and the machine alarm are change point data generated when a target changes. The facility measurement values 1 to 3 are, for example, temperatures of the machine.

In the situation shown in FIG. 5, the man data, the machine alarm, and the facility measurement values 1 to 3 are generated independently of the manufacturing process, and may thus have no product ID for specifying the manufacturing process as the connection key.

FIG. 6 is a diagram showing an example of the transaction data having no product ID that is the connection key. In an example of FIG. 6, as the transaction data, a machine alert table 601 and a machine temperature table 602 accumulated in the transaction data accumulation unit 4 are shown.

The machine alert table 601 is the table data having a table name "machine alert", and includes a column 611 having a column name "alert name" and a column 612 having a column name "generation time". The column 611 stores the alert name indicating the type of the machine alert as a value, and the column 612 stores a generation time indicating a date and time when the machine alert is generated as a value.

The machine temperature table 602 is the table data having a table name "machine temperature", and includes a column 621 having a column name "measurement temperature" and a column 622 having a column name "measurement time". The column 621 stores a machine temperature which is a temperature of the machine as a value, and the column 622 stores the measurement time indicating the date and time when the machine temperature is measured as a value.

As shown in FIG. 6, the machine alert table 601 and the machine temperature table 602 have no product ID that is the connection key.

FIG. 7 is a diagram showing an example of association data in a case of referring to the transaction data having no product ID that is the connection key. FIG. 7 shows an example of the task information and the machine information included in the association data generated by the association data registration unit 12, and the association data is registered in the association data accumulation unit 14.

Task information 700 shown in FIG. 7 corresponds to the task information 302 shown in FIG. 4, and a value of each item is also the same as the task information 302. Machine information 710 shown in FIG. 7 corresponds to the machine information 321 shown in FIG. 4, and is a link logic parameter having a data structure of non-link reference destination information in which values of an item "machine alert" 711 and an item "machine maximum temperature" 712 corresponding to the item "machine alert" and the item "machine maximum temperature" of the machine information 321 are defined by the association data model. The link logic parameter of the item "machine alert" 711 may be referred to as an alert link logic parameter, and the link logic parameter of the item "machine maximum temperature" 712 may be referred to as a maximum temperature link logic parameter.

FIG. 8 is a diagram showing an example of the alert link logic parameter. An alert link logic parameter 800 shown in FIG. 8 has a data structure {(parameter 801, parameter 802, parameter 803), parameter 804, and parameter 805}. The parameter 801 indicates the generation time of the machine alarm, the parameter 802 indicates the task start time, the parameter 803 indicates the task end time, the parameter 804 indicates the column name "alert name", and the parameter 805 indicates the table name "machine alert".

FIG. 9 is a diagram showing an example of the maximum temperature link logic parameter. A maximum temperature link logic parameter 900 shown in FIG. 9 has a data structure {(parameter 901, parameter 902, parameter 903), parameter 904, parameter 905}. The parameter 901 indicates a measurement time of the machine alarm, the parameter 902 indicates a task start time, the parameter 903 indicates a task end time, the parameter 904 indicates the column name "measurement temperature", and the parameter 805 indicates the table name "machine temperature".

FIG. 10 is a diagram showing an example of the association data having the link logic parameter. Association data 300A shown in FIG. 10 is different from the association data 300 shown in FIG. 4 in that machine information 321A is included instead of the machine information 321. The machine information 321A is different from the machine information 321 in that the values of the item "machine alert" and the item "machine maximum temperature" of the machine information 321 are the alert link logic parameter 800 shown in FIG. 8 and the maximum temperature link logic parameter 900 shown in FIG. 9.

FIG. 11 is a flowchart showing an example of search processing for searching for the site data by the association search unit 15.

In the search processing, first, the association search unit 15 receives the search instruction from the user and specifies a search range, which is a range of the site data to be searched for, according to designation information included in the search instruction (step S101). For example, the search range indicates a period during which a product is manufactured in the manufacturing process, or a range of the product ID for identifying a product.

Subsequently, with reference to the association data accumulation unit 14, the association search unit 15 creates a list of the task information of the task included in the search range, and displays the list on the user interface 6 (step S102). Here, it is assumed that the task B is included in the list.

Thereafter, the association search unit 15 receives information specifying a node and an item to be searched for from the task information of the task in the list and the 4M information related thereto from the user, and specifies the specified node and the item as a search node and a search item (step S103). Here, it is assumed that the search node is a machine B1, and the search item includes the item "machine alert" and the item "machine maximum temperature".

The association search unit 15 starts loop processing in which steps S105 to S111 are repeated for each search node (loop processing for each search node) (step S104).

In the loop processing for each search node, the association search unit 15 first executes loop processing in which steps S106 to S110 are repeated for each search item included in the site data of a target search node (loop processing for each search item) (step S105).

In the loop processing for each search item, the association search unit 15 checks whether an item value of the search item is the reference destination information, and determines whether the item value is acquired from outside (transaction data accumulation unit 4) (step S106).

When the item value is not acquired from the outside, the association search unit 15 acquires the item value of the search item (step S107).

When the item value is acquired from the outside, the association search unit 15 checks whether the connection key is included in the reference destination information, and determines whether the link logic model is necessary for acquiring the item value (step S108).

When the link logic model is not necessary, the association search unit 15 acquires the item value of the search item via the accumulation data acquisition unit 16 based on the reference destination information (step S109). Specifically, the association search unit 15 acquires, as the item value of the search item, a value associated with the connection key indicated by the reference destination information among values stored in the column of the column name indicated by the reference destination information from the transaction data of the table name indicated by the reference destination information.

On the other hand, when the link logic model is necessary, the association search unit 15 executes acquisition processing by the link logic that acquires the value of the search item via the link logic data acquisition unit 18 based on the reference destination information (see FIGS. 12 and 13) (step S110).

When the value of the search item is acquired by one of the steps S107, S109, and S110, the association search unit 15 determines whether the loop processing for each search item is executed for all the search items (step S111). When the loop processing for each search item is executed for all the search items, the association search unit 15 exits the loop processing for each search item, and determines whether the loop processing for each search node is executed for all the search nodes (step S112). When the loop processing for each search node is executed for all the search nodes, the association search unit 15 exits the loop processing for each search node and ends the search processing.

FIG. 12 is a flowchart showing an example of the acquisition processing by the link logic of step S110 in FIG. 11. In an example of FIG. 12, the search node is the machine B1 and the search item is the "machine alert".

In the acquisition processing by the link logic, the link logic data acquisition unit 18 receives the alert link logic parameter 800 which is the reference destination information corresponding to the search item from the association search unit 15, analyzes the alert link logic parameter 800, specifies the values of the parameters 801 to 805 of the alert link logic parameter 800, and creates a correspondence relation table 810 between the parameters and the values (step S201). In FIG. 12, the parameters 801 to 805 are referred to as PARAMS 1 to 5, respectively.

The link logic data acquisition unit 18 acquires the link logic model for the alert link logic parameter 800 from the link logic definition unit 17 (step S202). It is assumed here that the link logic model is represented by a definition statement 820 as follows.

SELECT PARAM4 FROM PARAM5
WHERE PARAM1>=PARAM2 (820)
AND PARAM1<=PARAM3

The definition statement 820 indicates that a value satisfying a condition that the PARAM 1 is equal to or larger than the PARAM 2 and equal to or smaller than the PARAM 3 is directly acquired as the item value from values of a column of the PARAM 4 from a table of the PARAM 5. In the definition statement 820, a part from "FROM" to "<=PARAM 3" specifies a range of the external value used as the reference value that is used to acquire the item value, and a part "SELECT PARAM4" specifies an operation for the reference value. The definition statement 820 indicates that the reference value is set as the item value as it is, and, for example, a result obtained by performing a predetermined operation on the reference value may be used as the item value. The operation includes, for example, an operation of calculating a maximum value and an average value.

Based on the correspondence relation table 810, the link logic data acquisition unit 18 assigns values of the parameters (the PARAMS 1 to 5) of the alert link logic parameter 800 to the definition statement 820, which is the link logic model, to create a link logic (step S203). The link logic is represented by a logical expression 830 as follows.

SELECT alert name FROM machine alert
WHERE generation time>=task start time (830)
AND generation time<=task end time The logical expression 830 indicates that, among the values stored in the column of the column name "alert name" of the machine alert table of the table name "machine alert", the generation time acquires a value in a period from the task start time to the task end time as the item value of the item "machine alert".

The link logic data acquisition unit 18 acquires the item value from the transaction data accumulation unit 4 according to the created link logic, returns the item value to the association search unit 15 (step S204), and ends the processing. For example, when the task start time is "2020/08/07 08:10:30", the task end time is "2020/08/07 08:15:30", and the machine alert table is the machine alert table 601 shown in FIG. 6, a "machine alert A" is acquired as the item value.

FIG. 13 is a flowchart showing another example of the acquisition processing by the link logic of step S110 in FIG. 11. In an example of FIG. 13, the search node is the machine B1 and the search item is the "machine maximum temperature".

In the acquisition processing by the link logic, the link logic data acquisition unit 18 receives the maximum temperature link logic parameter 900 which is the reference destination information corresponding to the search item from the association search unit 15, analyzes the maximum temperature link logic parameter 900, specifies the values of the parameters 901 to 905 of the maximum temperature link logic parameter 900, and creates a correspondence relation table 910 between the parameters and the values (step S301).

In FIG. 13, the parameters 901 to 905 are referred to as the PARAMS 1 to 5, respectively.

The link logic data acquisition unit 18 acquires the link logic model for the maximum temperature link logic parameter 900 from the link logic definition unit 17 (step S302). It is assumed here that the link logic model is represented by a definition statement 920 as follows.

SELECT MAX (PARAM4) FROM PARAM5
WHERE PARAM1>=PARAM2 (920)
AND PARAM1<=PARAM3

The definition statement 920 indicates that a maximum value of a value satisfying a condition that the PARAM 1 is equal to or larger than the PARAM 2 and equal to or smaller than the PARAM 3 is acquired as the item value among values of the column of the PARAM 4 from the table of the PARAM 5.

Based on the correspondence relation table 910, the link logic data acquisition unit 18 assigns the values of the parameters (PARAMS 1 to 5) of the maximum temperature logic parameter 900 to the definition statement 920, which is the link logic model, to create a link logic (step S303). The link logic is expressed by a logical expression 930 as follows.

SELECT MAX (measurement temperature) FROM machine temperature
WHERE measurement time>=task start time (930)
AND measurement time<=task end time The logical expression 930 indicates that among the values stored in the column of the column name "measurement temperature" of the machine temperature table of the table name "machine temperature", the generation time acquires a maximum value of the value in a period from the task start time to the task end time as the item value of the item "machine maximum temperature".

The link logic data acquisition unit 18 acquires the item value from the transaction data accumulation unit 4 according to the created link logic, returns the item value to the association search unit 15 (step S304), and ends the processing. For example, when the task start time is "2020/08/07 08:10:30", the task end time is "2020/08/07 08:15:30", and the machine alert table is the machine temperature table 602 shown in FIG. 6, "98° C." is acquired as the item value.

As described above, according to the present embodiment, the link logic definition unit 17 holds the link logic that is definition information defining the correspondence relation between the item value of the site data and the reference value which is the external value of transaction data used for acquiring the item value. The link logic data acquisition unit 18 acquires the item value of the site data by using the link logic. Therefore, even when no connection key exists in the transaction data, it is possible to acquire the item value of the site data based on the transaction data, and thus it is possible to acquire desired site data without changing the data structure of the transaction data. Therefore, it is possible to acquire the desired site data while preventing the increase in cost.

In addition, in the present embodiment, the association data registration unit 12 analyzes a plurality of types of site data and generates association data indicating the association of each piece of site data. Based on the association data, the association data search unit 15 searches for the site data related to the site data generated according to a specification task that is the specified task. The link logic data acquisition unit 18 acquires the item value of the searched site data. Therefore, it is possible to acquire the item value of the site data at the time of acquiring the desired site data.

Further, in the present embodiment, the link logic defines a correspondence relation by a logical expression having one or more parameters, and the link logic data acquisition unit 18 assigns a value corresponding to the item value to the parameter to specify a reference value, and acquires an item value based on the reference value. Therefore, it is possible to specify an appropriate reference value according to the item value.

In the present embodiment, the external data includes the acquisition date and time at which each external value is acquired, and the link logic defines the acquisition date and time at which the external value used as the reference value is acquired. Therefore, it is possible to specify an appropriate reference value according to the item value.

In the present embodiment, the external data has a table structure, and the link logic defines a column for storing an external value used as the reference value in the external data. Therefore, it is possible to specify an appropriate reference value according to the item value.

In the present embodiment, there are a plurality of pieces of external data, and the link logic defines the external data having the external value used as the reference value. Therefore, it is possible to specify an appropriate reference value according to the item value.

In the present embodiment, the link logic defines the operation for calculating the item value from the reference value. Therefore, it is possible to acquire the appropriate reference value according to the item value.

The embodiment of the present disclosure described above is an example for the purpose of explaining the present disclosure, and the scope of the present disclosure is not intended to be limited only to the embodiment. A person skilled in the art can implement the present disclosure in various other embodiments without departing from the scope of the present disclosure.

REFERENCE SIGNS LIST

1: information collection system
2: data generation device
3: master data accumulation unit
4: transaction data accumulation unit
5: dictionary database
6: user interface
7: application program
10: association data model creation unit
11: comparison data definition unit
12: association data registration unit
13: temporary accumulation unit
14: association data accumulation unit
15: association data search unit
16: accumulation data acquisition unit
17: link logic definition unit
18: link logic data acquisition unit
19: analysis data accumulation unit
20: data providing API unit

The invention claimed is:

1. An information system for acquiring an item value that is a value of site data based on an external value that is a value of external data, the information system comprising: a processor; and a memory coupled to the processor, the memory storing instructions that when executed by the processor configures the processor to:

store a link logic model that is definition information defining a correspondence relation between the item value and a reference value that is the external value used for acquiring the item value, and obtain a search node and a search item to be searched from stored task information, among the site data, to search for, for each search item in the site data, determine whether the link logic model is necessary for acquiring the item value based on the external value, upon determining the link logic model is not necessary, acquire the item value from the search item, upon determining the link logic model is necessary,
obtain a link logic parameter of the search item,
create a correspondence relation table between parameters and values of the site data corresponding to the parameters,
acquire the link logic model,
based on the correspondence relation table, assign values of the parameters to create link logic based on the link logic model, and
acquire the item value of the site data based on the link logic.

2. The information system according to claim 1, wherein the site data is generated according to a plurality of tasks in a manufacturing process of manufacturing a product, wherein the process is configured to:

generate association data indicating an association between a plurality of pieces of the site data, and search for a designated site data based on the association data.

3. The information system according to claim 1, wherein the link logic defines the correspondence relation by a logical expression having one or more parameters, and wherein the processor is configured to specify reference value by assigning a value corresponding to the item value into the parameter, and acquire the item value based on the reference value.

4. The information system according to claim 1, wherein the external data includes an acquisition date and time at which each external value is acquired, and wherein the link logic defines an acquisition date and time at which the external value to be used as the reference value is acquired.

5. The information system according to claim 1, wherein the external data has a table structure, and wherein the link logic defines a column configured to store the external value to be used as the reference value in the external data.

6. The information system according to claim 1, wherein a plurality of pieces of the external data are provided, and wherein the link logic defines the external data having the external value used as the reference value.

7. The information system according to claim 1, wherein the link logic defines an operation configured to calculate the item value from the reference value.

8. An information collection method performed by an information system for acquiring an item value that is a value of site data based on an external value that is a value of external data, the information collection method comprising:

holding a link logic model that is definition information defining a correspondence relation between the item value and a reference value that is the external value used for acquiring the item value;

obtaining a search node and a search item to be searched from stored task information, among the site data, to search for;

for each search item in the site data, determining whether the link logic model is necessary for acquiring the item value based on the external value;

upon determining the link logic model is not necessary acquiring the item value from the search item;

upon determining the link logic model is necessary:
obtaining a link logic parameter of the search item;
creating a correspondence relation table between parameters and values of the site data corresponding to the parameters;
acquiring the link logic model;
based on the correspondence relation table, assigning values of the parameters to create link logic based on the link logic model, and
acquiring the item value of the site data based on the link logic.

\* \* \* \* \*